March 6, 1962  R. B. SMITH ETAL  3,024,365
AUTOCOLLIMATOR
Filed April 21, 1959  2 Sheets-Sheet 1
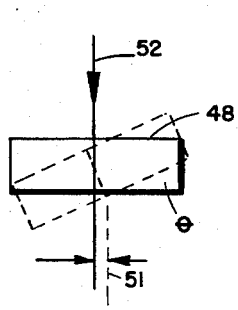
FIG. 2
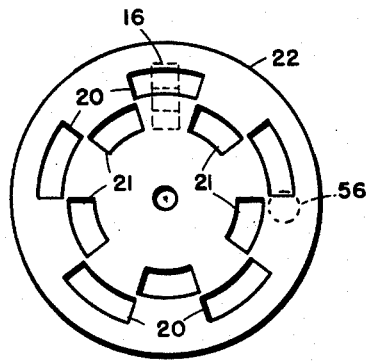
FIG. 3
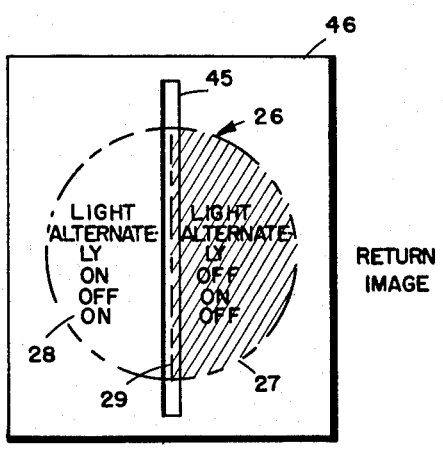
FIG. 5
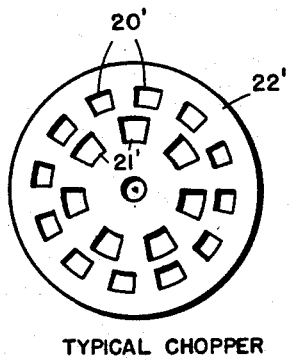
TYPICAL CHOPPER
FIG. 6
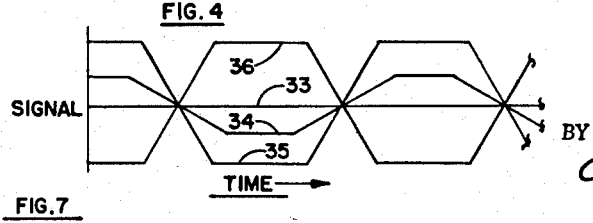
FIG. 4
FIG. 7
INVENTORS.
RAYMOND B. SMITH
BILL J. SIMMONS
ROBERT W. HALL
BY
Allan Rottenberg
ATTORNEY

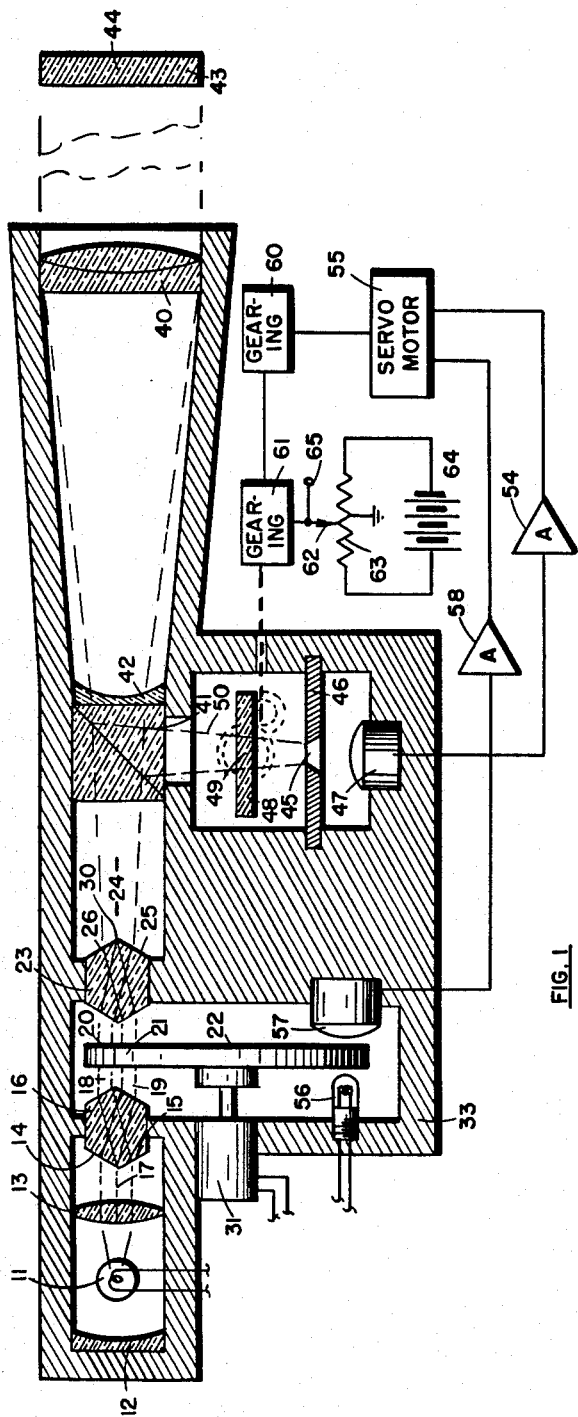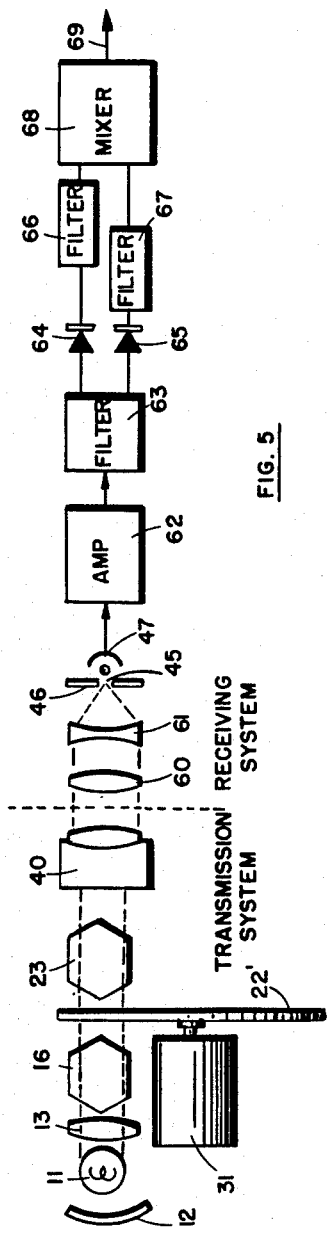
FIG. 1
FIG. 5
INVENTORS
RAYMOND B. SMITH
BILL J. SIMMONS
BY ROBERT W. HALL
*Allen Rothenburg*
ATTORNEY

United States Patent Office 3,024,365
Patented Mar. 6, 1962

3,024,365
AUTOCOLLIMATOR
Raymond Borden Smith, Anaheim, Bill J. Simmons, Los Alamitos, and Robert W. Hall, Long Beach, Calif., assignors to North American Aviation, Inc.
Filed Apr. 21, 1959, Ser. No. 807,871
13 Claims. (Cl. 250—201)

This invention relates to autocollimating apparatus, and more particularly to apparatus for generating an electrical output signal in accordance with the angular position of an external device.

It is often necessary to monitor the position or motion of certain types of apparatus. For example, a stable platform of an inertial reference device is initially aligned with the aid of a mirror attached thereto. Such a mirror will reflect a light beam in a direction coinciding with the transmission of the beam when the plane of the mirror is normal to the axis of the transmitted beam. Deviation of the reflected beam from the transmitting axis is utilized to generate an output signal by means of which the platform and its mirror are aligned. Prior photoelectric autocollimating systems have a number of inherent disadvantages which limit their use and accuracy. Chief among these disadvantages is the drift of the sensed angle with time, a drift which is caused largely by the use of a photocell in the circuit as a direct-current measuring device. In such an arrangement, changes in the sensitivity in the various portions of the photocell sensitive surface cause an apparent change in the position of zero angle deviation. Further, such systems lack sensitivity, principally because of various noise problems. Other disadvantages of prior systems include poor linearity over the range of angles to be measured, sensitivity of the system to changes in light source, requirements for precision control of frequency or voltage in the primary supply, inability to separate the transmission system from the image receiving system, sensitivity to temperature changes and sensitivity of the optical system to ambient light. In those systems using alternating-current coupling in the amplifier stages and the chopping of the return light there is a high sensitivity to ambient light.

Accordingly, it is an object of this invention to provide autocollimating apparatus which is free of the above enumerated disadvantages. In accordance with a preferred embodiment of the invention, there is generated an image of a radiant energy source which image has a pair of image sections contiguous to each other along a predetermined line extending through the image. Each image section is modulated or chopped with either a different phase of a nominally fixed frequency or with a different frequency. The modulated image is directed to a radiant energy transducer such as a photocell through an elongated aperture or slit which is positioned so that its longitudinal center line is substantially parallel to the line dividing the two image sections. The output of the transducer is thus a measure of the angular deviation between the direction of transmission of the projected image and the direction of reception of the energy impinging upon the transducer. The transducer output may be utilized to rotate the receiving portion of the apparatus toward alignment with the projecting portion thereof. Alternatively, a deviation plate may be positioned in accordance with the transducer output to shift the received radiant energy relative to the receiving aperture to thus servo the received energy beam to a null position. In such an arrangement, the position of the deviation plate itself is a measure of the sensed angular deviation.

By utilizing the edge of a rigidly mounted prism to form the dividing line of the image sections, the zero angle, or offset, is made independent of photoelectric sensitivity while mechanical shift due to vibration and temperature change is negligible. Decrease of zero angle drift will permit increased sensitivity so that the autocollimator constructed in accordance with the principles of this invention is capable of detecting movements of an external mirror of as little as 0.1 second of arc.

The system is largely free from the adverse effects of ambient light pickup due to the utilization of an image which is chopped before transmission. Thus, the autocollimator may be utilized to detect motion of a mirror against a background of high reflectivity such as, for example, the skin of a missile or airplane.

The use of a deviation plate and its follow-up servo system maintains the received image centered at all times on a particular area of the sensitive surface of the photocell. Thus, linearity of the system is greatly improved.

The reference phase voltage for the deviation plate servo motor in one embodiment is generated by the same chopper which modulates the transmitted image. Thus, phase modulation of the output signal relative to the reference caused by variation of chopper speed is eliminated together with much of the unwanted noise. This arrangement additionally permits chopper operation at a frequency different from the incoming line frequency so that the usual pickup at line frequency causes no adverse effects.

Minimization of the effects of movement of the light source, or chopper, is achieved by the use of a novel optical system. In one embodiment, the radiant energy source is separated into two distinct beams, each of which is modulated in different phase relationships or at different frequencies. The beams are then recombined so that the image presented for transmission consists of two image sections illuminated in mutually different phase or frequency relationships. The image is thus physically stable and adverse effects due to axial or radial motion of the chopper itself are eliminated.

It is an object of this invention to provide improved aligning apparatus.

Another object of the invention is to provide angular deviation measuring apparatus wherein but a single element thereof is servoed to a null position.

Another object of the invention is to provide an autocollimator which is insensitive to variations of input frequency.

A further object of the invention is the provision of an autocollimating apparatus which is independent of variations in sensitivity of different portions of a surface of a photocell and independent of time variations of such sensitivity.

Still another object of the invention is to provide an autocollimator of improved linearity.

Another object of the invention is to provide an autocollimator which projects a modulated image having a zero angle reference line determined by an immovable rigidly-mounted element.

Other and further objects, features and advantages of the invention will become apparent as the description proceeds.

A better understanding of the invention will be afforded by the following description considered in conjunction with the accompanying drawings in which:

FIG. 1 illustrates an autocollimator constructed in accordance with one embodiment of the invention;

FIG. 2 illustrates the operation of a deviation plate;

FIG. 3 shows a chopper for use in the embodiment of FIG. 1;

FIG. 4 illustrates the nature of the received modulated image;

FIG. 5 shows a modification of the apparatus of FIG. 1;

FIG. 6 illustrates a typical chopping disc for use in the embodiment of FIG. 5; and FIG. 7 illustrates the phase change of a signal generated in the embodiment of FIG. 1.

In the drawings, like reference characters refer to like parts.

As illustrated in FIG. 1, a source of radiant energy such as a light emitting lamp 11 generates an energy beam which is collected and collimated by a condenser system including reflector 12 and lens 13 for transmission to faces 14 and 15 of a fixedly mounted beam splitting prism 16. The energy source 11 may be a conventional incandescent lamp. The transmitted beam 17 emerges from the prism 16 as a pair of physically separated beams 18, 19 positioned so as to pass through the apertures 20 and 21 respectively formed in a rotatably mounted modulating or chopper disc 22. (See FIG. 3.) The chopper disc 22 is driven by a motor such as synchronous motor 31 at a uniform speed. The aperture rows 20 and 21 are concentric, the circumferentially extending center lines of the apertures in the two rows being mutually displaced radially. However, the rows are positioned to have a minimum radial separation between the inner edge of the apertures of the outer row 20 and the outer edge of the apertures of the inner row 21. The apertures of two rows are out-of-phase or mutually displaced circumferentially. With the disc illustrated, the number of apertures in each row is the same whereby the separated beams 18 and 19 are modulated at the same frequencies but in opposite phase relationship.

The separated modulated energy beams 18 and 19 are transmitted to a second fixedly mounted prism 23 which recombines the beams into a single beam 24. The faces 25 and 26 of prism 23 are illuminated by the combined modulated beam to thus provide the image which is projected by the system. As illustrated in FIG. 4, the image 26 comprises a pair of image sections 27, 28 which are contiguous to each other along a line 29 which comprises the zero or reference line of the system and its projected image. The two image sections 27, 28 correspond respectively to the prism faces 25, 26 with the dividing line 29 corresponding to the edge 30 of prism 23. With the aperture arrangement illustrated in FIG. 3, it will be seen that the two image sections are modulated with mutually opposite phase relation, i.e., when section 27 is illuminated, section 28 is dark and vice versa.

The modulated sectional image formed by the prism 23 is positioned at the focus of a collimating objective lens system 40 to thereby provide a collimated projection of the modulated sectional image to some suitable reflecting apparatus 43 mounted remote from and externally of the described projecting system. A conventional beam dividing cube 41 is provided to transmit the projected image to the collimating lens 40 and to reflect the energy beam reflected by an external mirror and received by the lens 40. A negative lens 42 is incorporated to permit reducing the overall length of the apparatus while at the same time maintaining a long effective focal length of the lens system. The beam dividing cube 41 may be a conventional and well-known transmitting reflecting device such as a common half-silvered mirror. The external reflecting device 43 may be a conventional mirror, mounted upon some apparatus not shown, whose angular position about an axis 44 normal to the plane of the paper is to be measured.

The modulated sectional image is reflected from mirror 43 through the objective lens system 40 to be reflected by the beam dividing cube 41 through an elongated aperture or slit 45 formed in a plate 46 which is rigidly mounted and optically conjugate with the image forming faces of prism 23. The reflected energy which is transmitted through the aperture 45 is received by a radiant energy transducer such as the photoelectric cell 47. Interposed between the slitted plate 46 and the beam divider 41 is a deviation plate 48 rotatably mounted in a bearing (not shown) for motion about an axis 49 normal to the plane of the paper. The several components, lens, prisms etc. are all mounted as illustrated in a suitable housing or case 33.

The deviation plate 48, as illustrated in FIG. 2, operates to displace the centerline 52 of an incoming energy beam 50 (FIG. 1) to the position thereof illustrated by the dotted line 51. The amount of displacement is a function of the index of refraction of the deviation plate and of the angle $\theta$ between the angular position of the plate and a null position thereof wherein the surfaces of the plate are normal to the direction of the beam 50. For small angles $\theta$, the displacement is proportional to the angle. The deviation plate 48 may be simply a transparent glass plate having parallel sides.

The image appearing at the aperture 45 of the apertured plate 46, as illustrated in FIG. 4, comprises the above-described sectional image 26 in which, in this arrangement, the light is alternately on and off in opposite phase in the two image sections. If the image is perfectly centered with respect to the aperture 45 so that the section line 29 of the image coincides with the longitudinal centerline of the slit 45, equal amounts of light energy from the two image sections will impinge upon the sensitive surface of the photocell causing a net alternating-current signal of zero as illustrated at 33 in FIG. 7. If, however, the external mirror 43 is rotated about axis 44 to a position where it is no longer normal to the transmitting optical axis, the returned image 26 will be displaced from the centerline of the aperture 45. Thus, a net alternating-current signal will appear at the output of photocell 47 having a phase and magnitude determined by the direction and magnitude of displacement. A displacement of image centerline 29 in an assumed positive direction but not beyond the edge of slit 45 will yield a signal such as illustrated at 34. A greater positive displacement yields signal 35 whereas an equal but negative displacement yields signal 36. This error signal from the output of the photocell 47 is amplified in amplifier 54 and fed to one of the two quadrature windings of a servo motor 55. The reference phase for the servo motor 55 is generated by an auxiliary light source 56 positioned on the opposite side of the chopping disc 22 with respect to a second photocell 57. The source 56 and photocell 57 are positioned one-quarter of the distance around the chopping disc 22 from the prisms 16 and 23 (FIG. 3) so that the output of photocell 57 is phase-displaced by 90° with respect to the output of the photocell 47. It is noted that the auxiliary light 56 and photocell 57 are illustrated in FIG. 1 without regard to accuracy of physical positioning for convenience of illustration. The output of the photocell 57 is fed through amplifier 58 to the quadrature reference winding of servo motor 55. In this manner, variations of the speed of the chopper due to changes of line frequency or variation of friction of the motor bearings or the hunting inherent in synchronous motors is not transmitted directly to the system as an error since the reference phase is at all times in quadrature with the signal phase.

The servo motor 55 drives through gearing 60 and 61 the rotatably mounted deviation plate 48. The phasing of the error signal at the output of phototube 47 and the other elements of the servo system are chosen so as to cause the servo motor to drive the deviation plate in a direction which causes the plate to displace the returned image toward coincidence of zero line 29 (FIG. 4), thereof with the centerline of the aperture 45. Thus, the servo drive system, including the deviation plate 48, apertured plate 46, photocell 47, and the amplifier motor and gearing, operates to restore equilibrium and maintain the modulated image centered at the aperture 45.

The servo motor 55 also drives via gearing 60 and 61 the wiper 62 of a center tap grounded potentiometer 63 which is energized by a suitable precision voltage source 64. An output lead 65, coupled with the potentiometer wiper 62 provides an output signal proportional to the angular deviation of the plate 48 from a null position thereof and thus provides a measure of the angular deviation of the mirror 43 with respect to the collimating axis.

It will be seen that a provision of a relatively narrow and elongated aperture 45 causes the returned energy to be directed to the same portion of the sensitive surface of the photocell 47 despite angular deviation of the reflected mirror 43, particularly since the deviation plate 48 is servoed to align the returned image with the slit 45. Further, variations in sensitivity of the photocell with time will not affect the overall output voltage of the system but simply operate to change the noncritical gain of the servo loop including the deviation plate, photocell and servo motor. It will be readily appreciated that linearity of the potentiometer output is achieved by limiting the angle of rotation or making the resistance of the potentiometer 63 to vary inversely with respect to the trigonometric relation between the returned beam displacement and the rotation of the deviation plate (as illustrated in FIG. 2).

With the arrangement of FIG. 1, if more than a simple measurement is desired, it is obvious that the output signal on lead 65 may be utilized to drive suitable torquers, servo motors, or follow-up systems which will operate to rotate the external mirror 43 and the apparatus on which it is mounted. In those applications wherein the external apparatus to be aligned can have no external mechanical or electrical connections, the collimator of FIG. 1 can be modified as illustrated in FIG. 5. In this arrangement, the modulated image generating and transmitting portion of the apparatus may be substantially similar to that described in connection with FIG. 1 and will include a source 11, reflector 12, lens 13, prisms 16 and 23, collimating lens system 40, chopper drive motor 30, all arranged as described in connection with FIG. 1. The chopper disc 22', as illustrated in FIG. 6, in this arrangement will have a different number of apertures in each of its rows 20' and 21' whereby the two image sections will be modulated at different frequencies. Mounted on the external apparatus which is to be aligned, is a radiant energy receiving system including a collimating lens 60 which focuses the receiving energy beam through negative lens 61 to the aperture 45 of an apertured plate 46 which may be identical to the similar element of FIG. 1. As in the arrangement of FIG. 1, the energy passing through the aperture 45 is received by the transducer or photocell 47. Thus, if the axis of the transmitting system is aligned with the axis of the receiving system (if the latter is properly aligned) the output of the photocell will comprise equal components of two frequencies. For example, if the chopper 22' is rotated at 80 r.p.s. and the apertures in each row are respectively 12 and 7 in number as illustrated, the output of the photocell output will have components of 960 and 560 c.p.s. respectively. The signal from the photocell is fed through amplifier 62 to a filter 63 which separates the two signal components according to their frequency. Each signal frequency is rectified in its respective circuit by diodes 64 and 65, filtered in a smoothing network 66, 67 and fed to a mixing network 68 which provides an output signal on lead 69 having a magnitude and sense in accordance with the algebraic difference between the two direct-current inputs thereto. This output signal, which is provided by the apparatus mounted upon the device to be aligned, may thus be utilized to effect such alignment without external electrical or mechanical connections.

In the arrangement of FIG. 5, the reference frequency derived from the rotation of the chopper disc is not available and thus it is necessary to modulate the two image sections at different frequencies. By this arrangement, the sense of the deviation from alignment is available since deviation in one direction will increase the magnitude of the signal component of one frequency (such as that generated by the higher frequency modulation of one image section) and at the same time decrease the magnitude of the other image section signal component (modulated at the lower frequency). It will be readily appreciated that this dual frequency arrangement may be utilized in the arrangement of FIG. 1 in the place of the auxiliary lamp 56 and auxiliary phototube 57, together with the alternating-current servo drive thereof.

Although the invention has been described and illustrated in detail, it is to be clearly understood that the same is by way of illustration and example only and is not to be taken by way of limitation, the spirit and scope of this invention being limited only by the terms of the appended claims.

We claim:
1. Collimating apparatus comprising means for generating an energy beam of predetermined area, means for simultaneously modulating with a predetermined phase difference, the energy of said beam in mutually contigious portions on each side of a diametrical line of said area, a radiant energy transducer for receiving said modulated energy beam, means for transmitting said received energy to said transducer comprising an element having an elongated aperture, servo means responsive to said transducer for shifting said received energy beam toward coincidence of said diametrical line thereof with the longitudinal center line of said elongated aperture, and output means coupled with said servo means.

2. Collimating apparatus comprising a light source, a collimating lens, a pair of prisms interposed between said source and lens, a light chopping disc rotatably mounted between said prisms and having a pair of radially spaced rows of apertures therein, the apertures of each row being circumferentially displaced from the apertures of the other row, a transmitting reflecting element interposed between said prisms and said collimating lens, a photocell positioned to receive light received by said lens and reflected by said element, a member having an elongated aperture therein interposed between said photocell and said element, a rotatably mounted deviation plate interposed between said element and said apertured member, and a servo system having an input from said photocell and connected to rotate said deviation plate.

3. Collimating apparatus comprising means for generating an energy beam having first and second areas mutually contiguous along a boundary therebetween, means for simultaneously modulating with a predetermined phase difference, the energy of said beam in each of said areas, a radiant energy transducer for receiving said modulated energy beam, means for transmitting said received energy to said transducer comprising an element having an elongated aperture, servo means responsive to said transducer for shifting said received energy beam toward coincidence of said boundary thereof with the longitudinal center line of said elongated aperture, and output means coupled with said servo means.

4. Collimating apparatus comprising a radiant energy transducer, means including a member having an elongated aperture for transmitting radiant energy to said transducer, image means for generating a dual section image split along a line extending across said image, said image means including chopping means for modulating the two image sections with mutually different phases, means for focusing said image at said aperture with said image splitting line substantially parallel to the longitudinal center line of said aperture, deviation means movably mounted relative to said transducer for shifting said image relative to said aperture, servo means responsive to said transducer for moving said deviation means in a sense to align said image splitting line and said aperture, and output means coupled with said servo means for indicating the position of said deviation means.

5. Collimating apparatus comprising a light source, a collimating lens, a pair of prisms interposed between said source and lens, a light chopping disc rotatably mounted between said prisms and having a pair of radially spaced rows of apertures therein, the apertures of each row being circumferentially displaced from the apertures of the other row, a transmitting-reflecting element interposed between said prisms and said collimating lens, a photocell positioned to receive light received by said lens and reflected by said element, a member having an elongated aperture therein interposed between said photocell and said element, a rotatably mounted deviation plate interposed between said element and said apertured member, an auxiliary light source mounted adjacent one side of said disc and circumferentially displaced from said prisms by a predetermined angle, an auxiliary photocell mounted on the other side of said disc and opposite said auxiliary source, and a servo system having an input from said first mentioned photocell and a reference input from said auxiliary photocell connected to rotate said deviation plate.

6. Collimating apparatus comprising a radiant energy transducer, means fixedly related to said transducer and including a member having an elongated aperture for transmitting radiant energy to a relatively small area of said transducer, image means for generating an image having a pair of sections mutually contiguous along a line extending substantially parallel to the longitudinal extent of said aperture, said image means including chopping means for modulating the two image sections with mutually different phases, means for focusing said image at said aperture, deviation means movably mounted relative to said transducer for shifting said image relative to said aperture, servo means responsive to said transducer for moving said deviation means in a sense to align said image and said aperture, and output means coupled with said servo means for indicating the position of said deviation means.

7. Collimating apparatus comprising a radiant energy source, means for generating an image of said source having a pair of image sections contiguous to each other along a predetermined line extending across said image, chopping means for modulating each image section with a different phase, an energy transducer, a member having an elongated aperture interposed between said chopping means and said transducer, means for transmitting said modulated image to said member with said predetermined line substantially parallel to the center line of said aperture, and means responsive to said transducer for generating a signal indicative of the relation between the line of said image and the center line of said aperture.

8. Collimating apparatus comprising a radiant energy source, a collimating lens, a disc rotatably mounted between said source and lens, said disc having a pair of radially spaced differentially phased rows of energy chopping apertures, means interposed between said disc and source for dividing energy from said source into two separate beams each directed through the apertures of an individual row of apertures, means for combining said beams, and receiving means responsive to receipt of said combined beams through said lens for indicating the angular deviation of said combined beams relative to said receiving means.

9. Collimating apparatus comprising a radiant energy source, means for generating an image of said source having a pair of image sections contiguous to each other along a predetermined line extending through said image, chopping means for modulating each image section with a different phase, a transmitting reflecting device mounted to transmit said modulated image to and reflect reflections thereof from a mirror external to said apparatus, an energy transducer mounted to receive the image reflected by said device, a member having an elongated aperture interposed between said transmitting reflecting device and said transducer, image deviating means interposed between said member and transmitting reflecting device for transmitting said modulated image to said member with said predetermined line substantially parallel to the center line of said aperture, servo means responsive to said transducer for generating a signal indicative of the relation between the line of said image and the center line of said aperture and connected to control said deviating means.

10. Collimating apparatus comprising a radiant energy source and a collimating lens, a disc rotatably mounted between said source and lens, said disc having a pair of radially spaced differentially phased rows of energy chopping apertures, first rigidly mounted prism means interposed between said disc and source for splitting energy from said source into two mutually spaced beams each directed through the apertures of an individual row of apertures, second rigidly mounted prism means interposed between said disc and lens for combining said beams in contiguity along an edge of said second prism means, a transmitting reflecting device interposed between said second prism means and said lens, an energy transducer, a fixedly mounted apertured plate interposed between transducer and said transmitting reflecting device, a pivotally mounted transparent beam deviating member interposed between said plate and said transmitting reflecting device, and servo means responsive to said transducer and referenced from said disc for angularly shifting said deviating member to shift the beam reflected by said transmitting reflecting device toward alignment with said aperture.

11. A collimating radiant energy projector comprising a prism having a pair of image forming faces meeting at a line forming an edge of said prism, means for generating a pair of radiant energy beams each illuminating an individual one of said faces, means interposed between said generating means and prism for effecting a mutually distinct modulation of the illumination of respective prism faces, means for transmitting a collimated image of said illuminated faces in a predetermined direction, transducer means for receiving said transmitted image, slitted means for passing said image to said transducer, and means responsive to said transducer for detecting misalignment between said slitted means and the image passed thereby.

12. A collimating radiant energy projector comprising means for producing a beam of radiant energy, means for dividing said beam into at least a pair of beam portions, modulating means for effecting mutually distinct modulation of each of said beam portions, and combining means for bringing said modulated beam portions into a predetermined mutually contiguous relationship along a boundary having a fixed relation to the axis of said projector.

13. Aligning apparatus comprising a support, a transducer fixedly secured to said support for receiving a radiant energy beam, a lens system on said support for gathering energy for transmission to said transducer, center line deviation means uniformly transparent to said beam and movably mounted upon said support for controlling the direction of transmission of energy from said lens system to said transducer, and servo means responsive to said transducer for controlling said deviation means so as to cause said energy to be directed in a predetermined null direction relative to said transducer.

References Cited in the file of this patent

UNITED STATES PATENTS

| | | |
|---|---|---|
| 2,421,012 | Chew | May 27, 1947 |
| 2,674,155 | Gibson | Apr. 6, 1954 |
| 2,803,752 | Warren | Aug. 20, 1957 |
| 2,806,405 | St. Amand | Sept. 17, 1957 |